US010116446B2

(12) United States Patent
Anthony et al.

(10) Patent No.: US 10,116,446 B2
(45) Date of Patent: *Oct. 30, 2018

(54) CRYPTOGRAPHIC IGNITION KEY (CIK) EMBEDDED IN REMOVABLE DATA CARTRIDGE

(71) Applicant: GE Aviation Systems LLC, Grand Rapids, MI (US)

(72) Inventors: Deven J. Anthony, Tampa, FL (US); John Jared Creech, Palmetto, FL (US)

(73) Assignee: GE Aviation Systems LLC, Grand Rapids, MI (US)

( * ) Notice: Subject to any disclaimer, the term of this patent is extended or adjusted under 35 U.S.C. 154(b) by 192 days.

This patent is subject to a terminal disclaimer.

(21) Appl. No.: 14/817,505

(22) Filed: Aug. 4, 2015

(65) Prior Publication Data

US 2017/0041141 A1    Feb. 9, 2017

(51) Int. Cl.
*H04L 29/06* (2006.01)
*H04L 9/32* (2006.01)
*G06F 21/34* (2013.01)
*G06F 21/35* (2013.01)

(52) U.S. Cl.
CPC ............ *H04L 9/3226* (2013.01); *G06F 21/34* (2013.01); *G06F 21/35* (2013.01); *H04L 9/3234* (2013.01)

(58) Field of Classification Search
CPC ..... H04L 9/3226; H04L 9/3234; G06F 21/35; G06F 21/34
See application file for complete search history.

(56) References Cited

U.S. PATENT DOCUMENTS

| 7,016,494 | B2 | 3/2006 | Hopkins et al. |
| 7,761,904 | B2 | 7/2010 | Hessel et al. |
| 8,239,691 | B2 | 8/2012 | Watanabe et al. |
| 8,542,828 | B2 | 9/2013 | Rudland et al. |
| 8,844,060 | B2 | 9/2014 | Applegate |
| 8,996,869 | B1 | 3/2015 | Canter et al. |
| 9,152,182 | B1 * | 10/2015 | McMahon ............ G06F 1/1658 |

(Continued)

FOREIGN PATENT DOCUMENTS

| EP | 2693787 | 6/2014 |
| WO | 2006063935 A1 | 6/2006 |

OTHER PUBLICATIONS

"Customer Commitment Newsletter", Thales Communications, Inc, vol. No. 05, Issue No. 01, pp. 1-12, 2010.

(Continued)

*Primary Examiner* — John B King
(74) *Attorney, Agent, or Firm* — GE Aviation Systems LLC; William Andes (57) ABSTRACT

Systems and methods using a removable data storage device having an embedded cryptographic ignition key (CIK) are provided. In one embodiment, a CIK device is embedded into a removable data cartridge used to transfer information for cryptographic processing to a host system. When the removable data cartridge is interfaced with the host system, the CIK device communicates a CIK used to authenticate a user so that the data subject to cryptographic processing can be transferred to and/or otherwise processed by the host system. Once user authentication has occurred, the removable data cartridge can transfer data to the host system for cryptographic processing.

20 Claims, 10 Drawing Sheets

(56) References Cited

U.S. PATENT DOCUMENTS

| | | |
|---|---|---|
| 2005/0086471 A1 | 4/2005 | Spencer |
| 2006/0253620 A1* | 11/2006 | Kang .................... G06F 3/0623 710/36 |
| 2007/0127719 A1 | 6/2007 | Selander et al. |
| 2009/0246985 A1 | 10/2009 | Mackey et al. |
| 2011/0072276 A1 | 3/2011 | Lee et al. |
| 2012/0260100 A1 | 6/2012 | Applegate |

OTHER PUBLICATIONS

"Cryptographic Ignition Keys: Implementation Methodology and Guidance", Information Assurance Specialists, Inc. pp. 1-13, 2011.
"Chairman of the Joint Chiefs of Staff Manual", Link 16 Joint Key Management Plan, pp. 58 pages, Apr. 28, 2015.
GB Combined Search & Examination report issued in connection with corresponding GB Application No. 1613115.3 dated Jan. 19, 2017.

* cited by examiner

CRYPTOGRAPHIC IGNITION KEY (CIK) EMBEDDED IN REMOVABLE DATA CARTRIDGE

FIELD OF THE INVENTION

The present subject matter relates generally to cryptographic processing of data.

BACKGROUND OF THE INVENTION

Cryptographic systems can include cryptographic equipment used for the processing and transfer of secure data. For instance, data transfer systems, such as avionic data transfer systems used in aviation systems, can include cryptographic equipment used to receive and transfer secure data among various devices. Cryptographic systems typically require one or more keys to be loaded into the system to allow the cryptographic processing of data. In addition, cryptographic equipment can require the presence of a cryptographic ignition key (CIK) for user authentication.

In some cryptographic systems, a CIK is included as part of a discrete CIK device that must be interfaced with cryptographic equipment at all times during cryptographic processing of data. For instance, a cryptographic data storage system can include an inline media encryptor (IME) where the CIK device and storage media are separate components. The CIK device can be interfaced with the IME as part of an authentication process to allow cryptographic processing of data for storage on and retrieval from the storage media. In systems where the storage media are removable, such as data transfer systems used in aviation systems, both the CIK device and the removable storage media may have to be interfaced with the cryptographic system for cryptographic processing of data to occur.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a removable data storage device. The removable data storage device includes a data memory disposed within a housing. The data memory stores data subject to cryptographic processing. The removable data storage device further includes at least one connector configured to be removably engaged with a host system and a cryptographic ignition key device disposed within the housing. The cryptographic ignition key device can include one or more cryptographic ignition keys for authentication of users. The removable data storage device further includes a data memory interface in communication with the data memory and configured to communicate data subject to cryptographic processing to the host system via that at least one connector. The removable data storage device further includes a cryptographic ignition key interface configured to communicate the one or more cryptographic ignition keys to the host system to authenticate a user of the host system.

Another example aspect of the present disclosure is directed to a method of authenticating one or more users of a cryptographic system. The method can include engaging a removable data storage device with a host system via at least one connector associated with the removable data storage device. The removable data storage device can include a data memory disposed within a housing. The data memory stores data subject to cryptographic processing by the host system. The removable data storage device further includes a cryptographic ignition key device disposed within the housing. The cryptographic ignition key device includes one or more cryptographic ignition keys. The method further includes communicating, by the removable data storage device, the one or more cryptographic ignition keys to the host system via a cryptographic ignition key interface for authentication of users of the host system. The method further includes transferring, by the removable data storage device, the data subject to cryptographic processing to the host system from the data memory via a data memory interface.

Yet another example aspect of the present disclosure is directed to a cryptographic system for use with an aircraft. The system can include an avionic data transfer system having one or more cryptographic units. The cryptographic system further includes a removable data storage device. The removable data storage device includes at least one connector configured to be removably engaged with the avionic data transfer system. The removable data storage device further includes a cryptographic ignition key device having one or more cryptographic ignition keys. The removable data storage device further includes a data memory storing data subject to cryptographic processing. When the removable data storage device is engaged with the avionic data transfer system, the removable data storage device is configured to transfer the one or more cryptographic ignition keys for use by the one or more cryptographic units in authenticating users. The removable data storage device is further configured to transfer the data subject to cryptographic processing to the avionic data transfer system for cryptographic processing by the one or more cryptographic units.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to a removable data storage device having an embedded cryptographic ignition key (CIK). In one embodiment, a CIK device is embedded into a removable data cartridge used to transfer information for cryptographic processing to a host system. When the removable data cartridge is interfaced with the host system, the CIK device communicates a CIK used to authenticate a user so that the data subject to cryptographic processing can be transferred to and/or otherwise processed by the host system. Once user authentication has occurred, the removable data cartridge can transfer data (e.g., data subject to cryptographic processing and/or one or more cryptographic keys) to the host system.

As an example, secure aviation data can be loaded into a removable data cartridge at an aviation planning terminal. One or more CIK devices embedded on the removable data cartridge can be configured at the terminal with varying CIKs for user authentication. The removable data cartridge can be inserted into an appropriate receptacle, slot, or connection at an avionic data transfer system associated with an aircraft. The data transfer system can include one or more cryptographic units. The CIK(s) can be used to authenticate a user for the data transfer system. Once the user is authenticated, the aviation data (and other information) can be transferred to the data transfer system for cryptographic processing.

A technical effect of example aspects of the present disclosure is that the mechanical and electrical design of host system can be simplified. For instance, it can reduce the overall size and weight of the host system by eliminating the need for a separate CIK device and a receptacle for receiving the CIK device on the host system. It addition, the process of user authentication using CIKs can be combined with the process of data cartridge loading, simplifying the cryptographic processing of data.

Example aspects of the present disclosure are discussed with reference to avionic data transfer systems associated with an aircraft for purposes of illustration and discussion. Those of ordinary skill in the art, using the disclosures provided herein, will understand that the subject matter described herein can be used with other cryptographic systems without deviating from the scope of the present disclosure.

Figure 1:
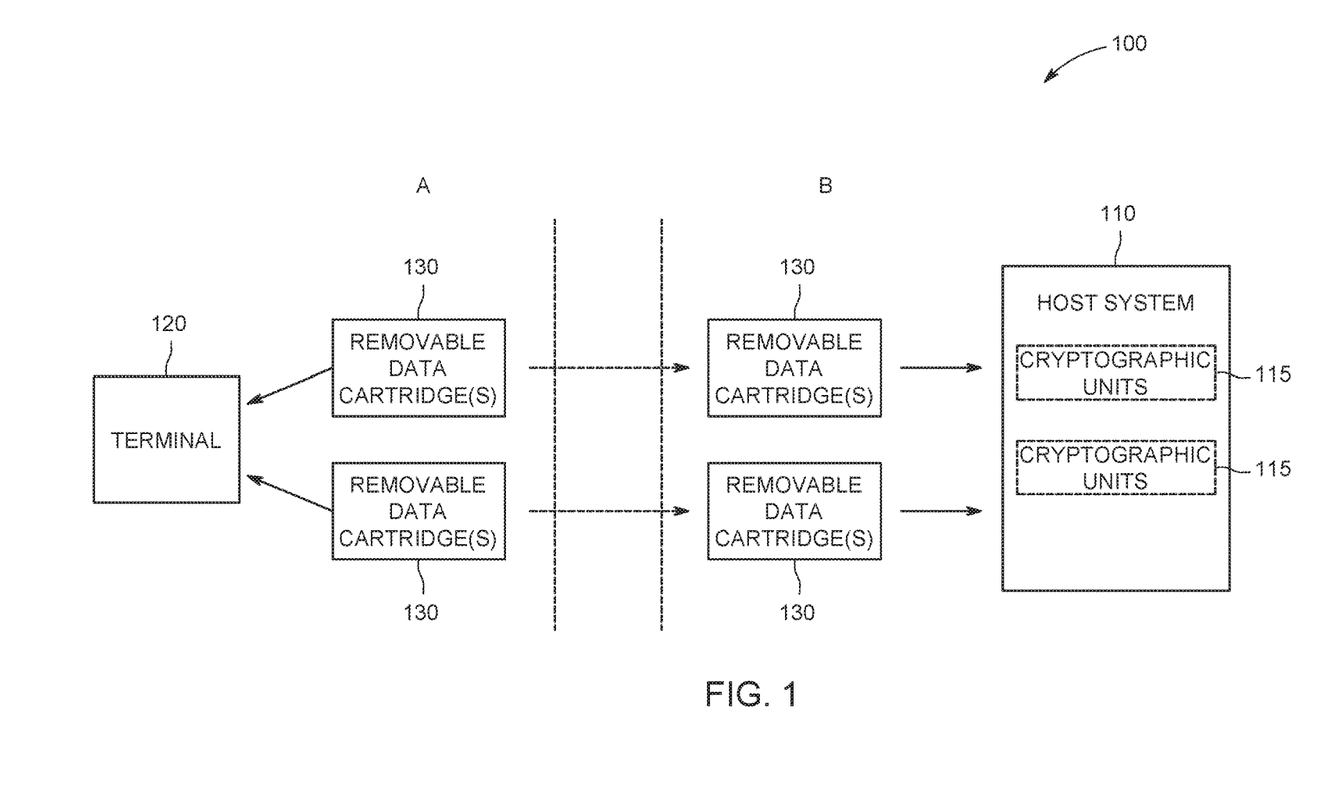
FIG. 1 depicts an example cryptographic system according to example embodiments of the present disclosure.

FIG. 1 depicts an example cryptographic system 100 according to example embodiments of the present disclosure. As shown the cryptographic system 100 includes a host system 110, a terminal 120, and one or more removable data cartridges 130 used to transfer information to the host system 110. The host system 110 can be a data transfer system associated with one or more cryptographic units 115. Each cryptographic unit 115 can include one or more processors configured to cryptographically process (e.g., encrypt/decrypt) data using various encryption algorithms and/or perform other cryptographic functions. In some embodiments, the host system 110 can be a data transfer system associated with an avionic data transfer system associated with an aircraft. In some embodiments, the host system 115 can include a plurality of cryptographic units 115 in communications with each other over a network, such as an aircraft communication bus (e.g., ARINC-429 or MIL-STD-1553) or other network connection (e.g., Ethernet).

Each cryptographic unit 115 can require one or more cryptographic keys or other cryptographic variables (e.g., frequency hopping tables) to enable the cryptographic processing of data. In addition, each cryptographic unit 115 can require the presence of a cryptographic ignition key (CIK) for authorized user authentication. The cryptographic unit 115 can require a CIK to be interfaced with the cryptographic unit 115 before undertaking the cryptographic processing of data.

The system 100 includes one or more removable data cartridges 130. Each removable data cartridge 130 can be a removable data storage device. The one or more removable data cartridges 130 can be used to transfer data subject to cryptographic processing to the host system 110. In one embodiment, secure aviation data for an aviation system can be transferred from the terminal 120 to one or more cryptographic units 115 of the host system 110 using the removable data cartridges 130.

For example, the one or more removable data cartridges 130 can be interfaced with terminal 120 located at site A. Information, including aviation data and/or cryptographic key configuration (CKC) data, can be transferred to the removable data cartridge(s) 130 at the terminal. The data transferred to the removable data cartridge(s) 130 can include both encrypted ("black") data as well as unencrypted ("red") data.

The removable data cartridge(s) 130 can be transported to site B to the location of the host system 110. For instance, in one embodiment, the removable data cartridge(s) 130 can be transported to the location of an aircraft. The removable data cartridge(s) 130 can be interfaced with the host system 110. According to example aspects of the present disclosure, the removable data cartridge(s) 130 can transfer data subject to cryptographic processing (e.g., the secure aviation data) to the host system 110. In some embodiments, the removable data cartridge(s) 130 can transfer one or more cryptographic keys (e.g., as a key fill device) to the host system 110. In some embodiments, the removable data cartridge(s) 130 can include an embedded CIK for user authentication.

Figure 2:
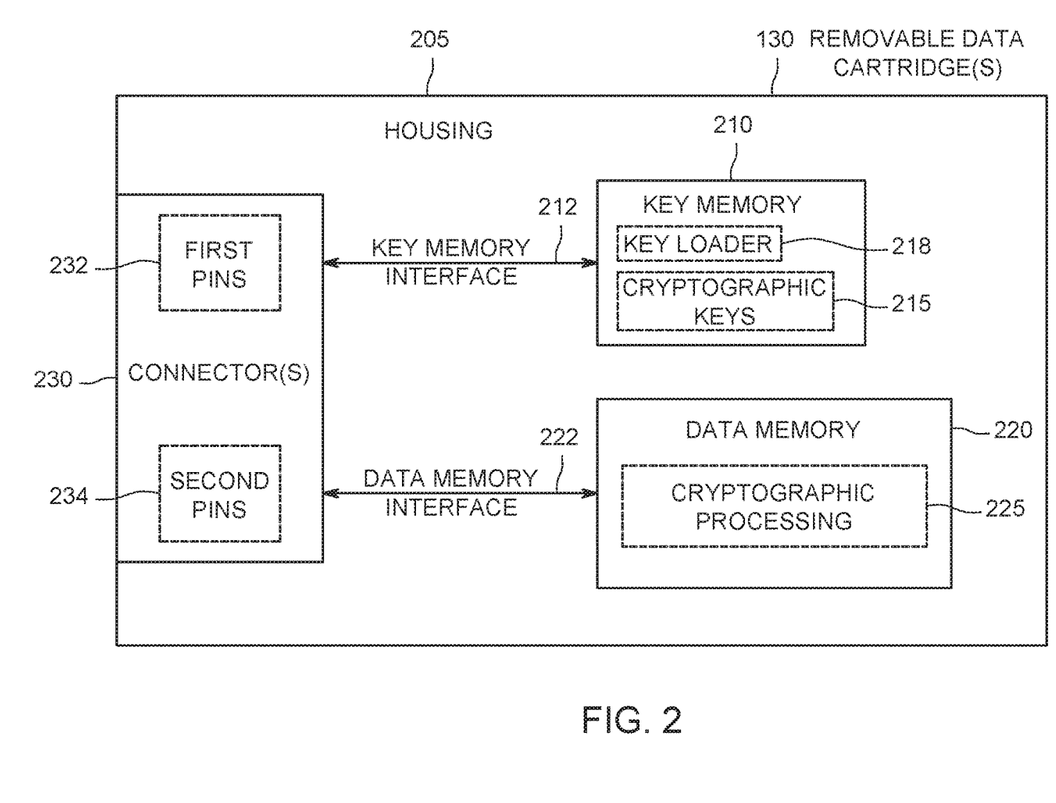
FIG. 2 depicts an example removable data cartridge according to example embodiments of the present disclosure.

FIG. 2 depicts an example removable data cartridge 130 according to example embodiments of the present disclosure. The removable data cartridge 130 can include a housing 205 to house and protect various internal components of the removable data cartridge 130. As shown in FIG. 2, the removable data cartridge 130 includes a dedicated key memory 210 and a dedicated data memory 220 that is separate from the key memory 210 within the housing 205. The key memory 210 can store one or more cryptographic keys 215 for use by a host system (e.g., host system 110 of FIG. 1) in cryptographic processing of data. The data memory 220 can store data subject to cryptographic processing 225 (e.g., secure aviation data). The data memory 220 can include both encrypted and decrypted data. In some embodiment, the data memory 220 does not store data (e.g., one or more cryptographic keys) that is used in cryptographic processing of the data by one or more cryptographic units associated with a host system.

As shown, the removable data cartridge 130 includes at least one connector 230. The connector 230 can be interfaced with an external device (e.g., a terminal or host system) by engaging the connector 230 with a suitable slot, socket, receptacle, or connection located on the external device to provide a mechanical and electrical connection with the external device. In the example embodiment shown in FIG. 2, the connector 230 can include first pins 232 and second pins 234. The first pins 232 and second pins 234 can be part of the same connector or separate connectors. In one embodiment, the first pins 232 can be a U-229 6-pin connector type used to transfer information using one or more serial protocols. The second pins 234 can include one or more pins arranged for a USB (universal serial bus) plug connection or similar connection.

The removable data cartridge 130 of FIG. 2 includes a key memory interface 212. The key memory interface 212 can communicate one or more cryptographic keys 215 stored in the key memory 210 using the first pins 232 of the connector (s) 230 according to a first protocol. The first protocol can be a serial protocol suitable for the transfer of cryptographic keys, such as a serial protocol used by key fill devices. As an example, the first protocol can be a DS-101 or DS-102 protocol used for the transfer of key material. Other suitable protocols can be used as the first protocol without deviating from the scope of the present disclosure, such as a USB protocol, I2C protocol, SPI protocol, or other suitable protocol.

The removable data cartridge 130 of FIG. 2 further includes a data memory interface 222 that is separate from the key memory interface 212. The data memory interface 222 can communicate data subject to cryptographic processing 225 stored in the data memory 220 using second pins 234 of the connector(s) 230 using a second protocol. In some embodiments, the second protocol can be different from the first protocol. The second protocol can be, for instance, a serial protocol suitable for the transfer of data subject to cryptographic processing 225, such as a USB protocol, I2C protocol, SPI protocol, or other suitable protocol.

In some embodiments, the removable data cartridge 130 can include a key loader 218. The key loader 218 can include computer-readable instructions that when executed by one or more processors (e.g., processors associated with the removable data cartridge or an external device) cause the one or more processors to perform operations. The operations can include loading the one or more cryptographic keys 215 stored in the key memory 210 to the host system via the key memory interface 212 according to the first protocol (e.g., a DS-101 or DS-102 protocol). In some embodiments, the key loader 218 can automatically load the one or more cryptographic keys 215 to the host system when the removable data cartridge 130 is interfaced with the host system. In other embodiments, the key loader 218 can transfer the one or more cryptographic keys 215 in response to a request (e.g., as a result of a user input via a user interface) to transfer the one or more cryptographic keys 215.

Figure 3:
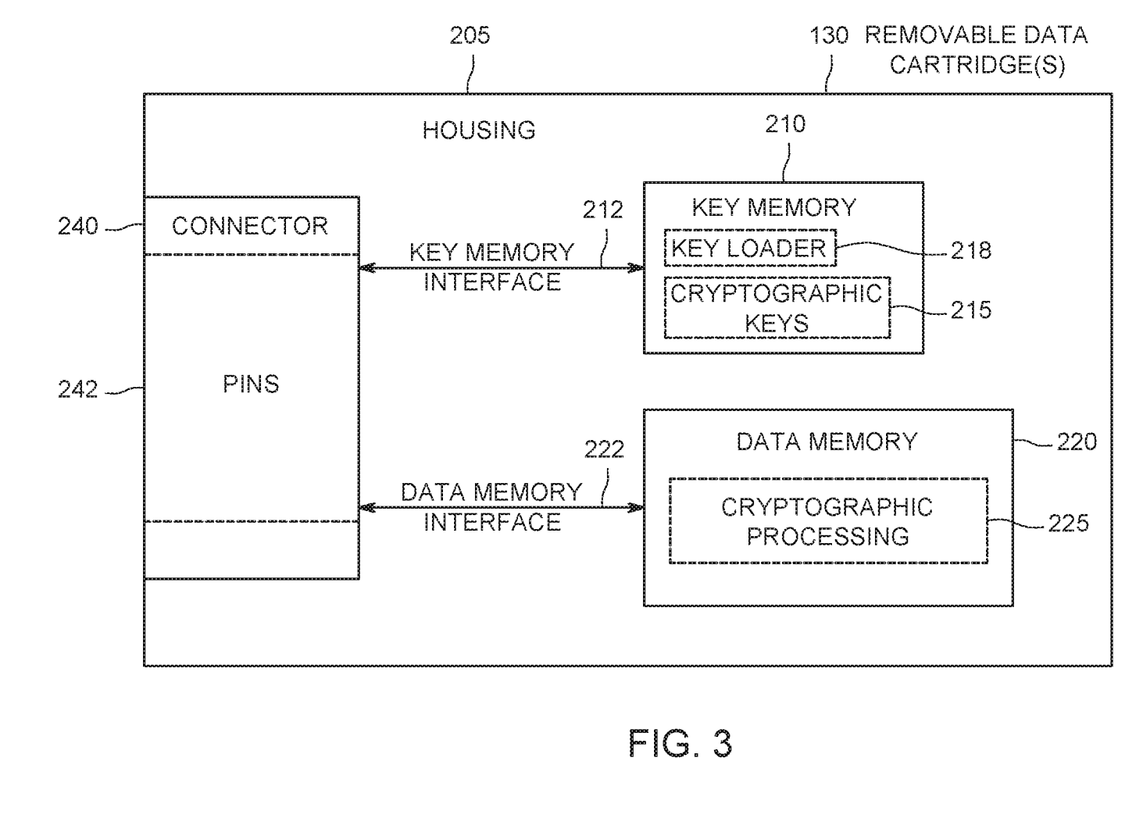
FIG. 3 depicts an example removable data cartridge according to example embodiments of the present disclosure.

FIG. 3 depicts a removable data cartridge 130 according to another example embodiment of the present disclosure. The removable data cartridge 130 of FIG. 3 is similar to the removable data cartridge 130 of FIG. 2 except that the removable data cartridge 130 of FIG. 3 includes a connector 240 having one set of pins 242 for communicating both the one or more cryptographic keys 215 and the data subject to cryptographic processing 225. The pins 242 can have any suitable configuration, such as a U-229 6-pin connector configuration, a USB (universal serial bus) plug configuration, or other suitable configuration.

The key memory 210 can be separately accessible via the pins 242 of the connector 240 relative to the data memory 220. More particularly, the one or more cryptographic keys 215 stored in the key memory 210 may not be accessible by the one or more pins 242 of the connector 240 at the same time as the data subject to cryptographic processing 225 stored in the data memory 220. In one embodiment, the one or more cryptographic keys 215 stored in the key memory 210 can be first transferred via the key memory interface 212 according to a first protocol. Subsequent to the transfer of the one or more cryptographic keys 215, the data subject to cryptographic processing 225 can be transferred via the data memory interface 222 via a second protocol. In other embodiments, the data subject to cryptographic processing 225 can be transferred prior to the transfer of the one or more cryptographic keys 215.

According to another example aspect of the present disclosure, the removable data cartridge(s) can include an embedded CIK device for user authentication during the cryptographic processing of data. In these example embodiments, a user desiring to perform cryptographic processing of data by one or more cryptographic units of a host system can interface the removable data cartridge(s) with the host system. A CIK device embedded in the removable data cartridge can communicate a CIK to the host system for user authentication. Once a user has been authenticated, data can be processed by the host system. For instance, data transferred to the host system can be encrypted and/or decrypted using one or more cryptographic keys.

Figure 4:
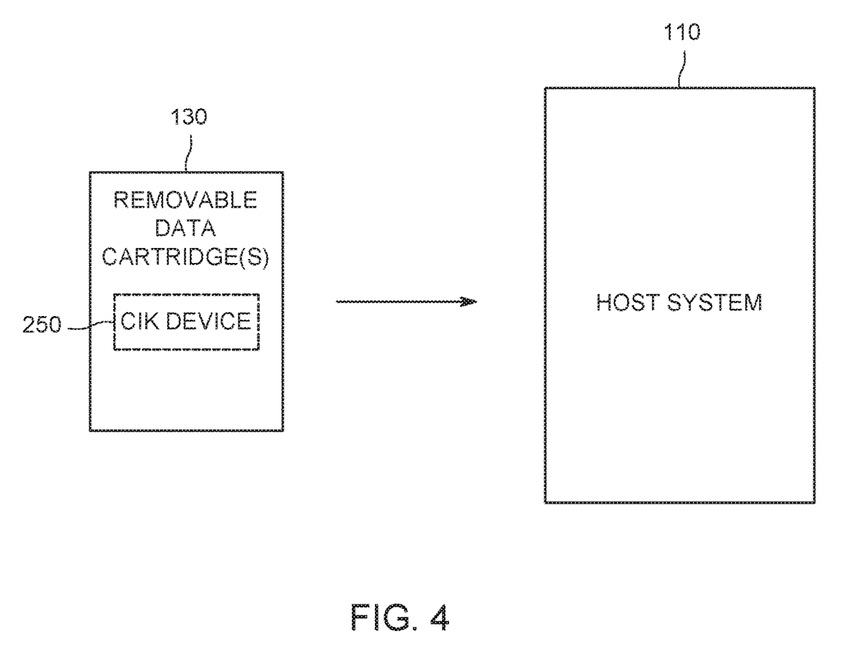
FIG. 4 depicts the example interfacing of a removable data cartridge having an embedded cryptographic ignition key (CIK) device according to example embodiments of the present disclosure.

For instance, FIG. 4 depicts an example removable data cartridge 130 with an embedded CIK device 250 according to example embodiments of the present disclosure. When the removable data cartridge 130 is engaged with or otherwise interfaced with the host system 110, the CIK device 250 embedded in the removable data cartridge can communicate a CIK to the host system 110 over a suitable CIK interface. In addition, the removable data cartridge 130 can transfer data subject to cryptographic processing (e.g., planning data) to the host system 110. The CIK can be communicated by the removable data cartridge 120 over the same interface or a different interface as the data subject to cryptographic processing.

For instance, in one embodiment, the data subject to cryptographic processing and the CIK can be communicated via at least one connector on the removable data cartridge 130 that is engaged with the host system 110. In one embodiment, the data subject to cryptographic processing can be communicated via the at least one connector on the removable data cartridge 130 that is engaged with the host system 110 and the CIK can be communicated over a separate interface, such as a dedicate CIK connector or a wireless interface.

Figure 5:
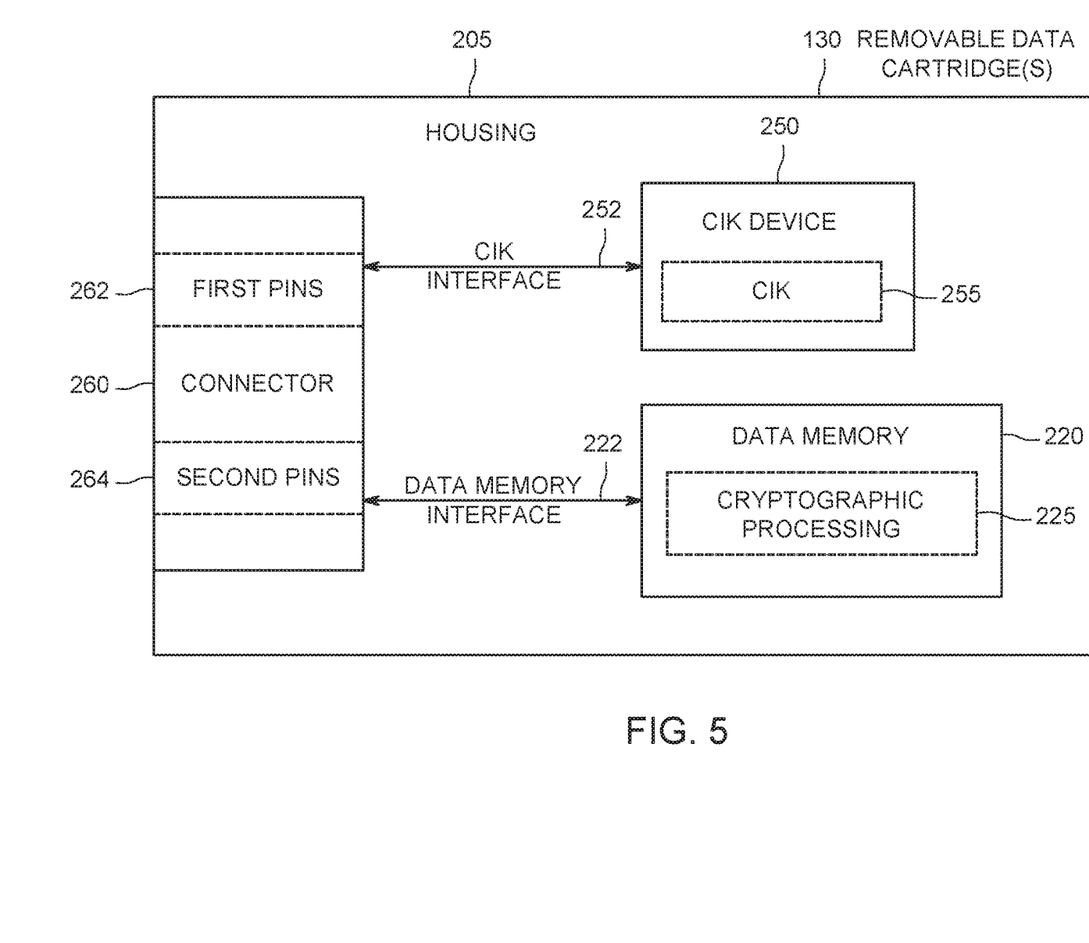
FIG. 5 depicts an example removable data cartridge having an embedded CIK device according to example embodiments of the present disclosure.

FIG. 5 depicts an example removable data cartridge 130 having an embedded CIK device according to example aspects of the present disclosure. The removable data cartridge 130 includes a housing 205 to house and protect various internal components of the removable data cartridge 130. As shown in FIG. 5, the removable data cartridge 130 includes a data memory 220. The data memory 220 can store data subject to cryptographic processing 225 (e.g., secure aviation data). The data memory 220 can include both encrypted and decrypted data. In some embodiments, the data memory 220 does not store data (e.g., one or more cryptographic keys) that is used in cryptographic processing of the data by one or more cryptographic units associated with a host system.

According to example aspects of the present disclosure, the removable data cartridge 130 includes an embedded CIK device 250. The embedded CIK device 250 can include circuitry configured to provide a CIK 255 to external devices for user authentication. For instance, a user can be associated with a particular CIK. An external device may need to receive the CIK associated with an authorized user prior to processing or communicating data. In one embodiment, the CIK device 250 can include a memory storing the CIK 255. In one embodiment, the CIK device 250 can include circuitry (e.g., a memory and transmitter) configured to wireless transmit a CIK for detection at an external device.

The removable data cartridge 130 of FIG. 5 includes at least one connector 260. The connector 260 can be interfaced with an external device (e.g., a terminal or host system) by engaging the connector with a suitable slot, receptacle, or connection located on the external device to provide a mechanical and electrical connection with the external device. In the example embodiment shown in FIG. 5, the connector 260 can include first pins 262 and second pins 264. The first pins 262 and second pins 264 can be part of the same connector or separate connectors.

The removable data cartridge 130 of FIG. 5 includes a CIK interface 252. The CIK interface 252 can communicate one or more CIKs 255 associated with the CIK device 250 using the first pins 262 of the connector(s) 260. The removable data cartridge 130 of FIG. 5 further includes a data memory interface 222 that is separate from the CIK interface 252. The data memory interface 222 can communicate data subject to cryptographic processing 225 stored in the data memory 220 using second pins 234 of the connector(s) 260.

In other embodiments, the CIK interface 252 can communicate one or more CIKs and the data memory interface 222 can communicate data subject to cryptographic processing over the same pins of connector connector(s) 260. For instance, one or more CIKs 255 can be first communicated via connector(s) 260 to an external device for user authentication. Data subject to cryptographic processing 225 can then be communicated via connector(s) 260 to the external device for cryptographic processing.

Figure 6:
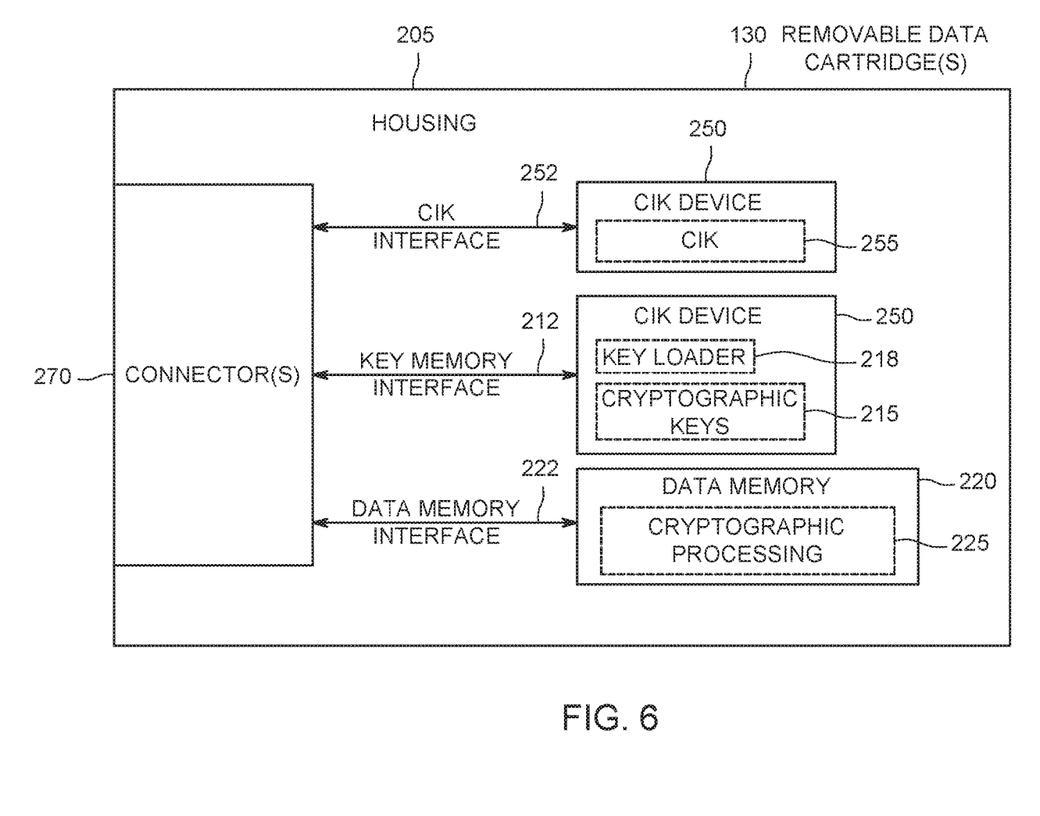
FIG. 6 depicts an example removable data cartridge having a key memory and an embedded CIK device according to example embodiments of the present disclosure.

FIG. 6 depicts an example removable data cartridge 130 according to another example embodiment of the present disclosure. The removable data cartridge 130 of FIG. 6 can be a combination key fill device, data transfer device, and CIK device for use with a cryptographic system. More particularly, the removable data cartridge includes a key memory 210, a data memory 220, and a CIK device 250 all stored within the same housing 205. The key memory 210 can store one or more cryptographic keys 215 for use by a host system in cryptographic processing of data. The data memory 220 can store data subject to cryptographic processing 225 (e.g., secure aviation data). The data memory 220 can include both encrypted and decrypted data. In some embodiment, the data memory 220 does not store data (e.g., one or more cryptographic keys) that is used in cryptographic processing of the data by one or more cryptographic units associated with a host system.

The CIK device 250 can include circuitry configured to provide a CIK 255 to external devices for user authentication. In one embodiment, the CIK device 250 can include a memory storing the CIK 255. In one embodiment, the CIK device 250 can include circuitry (e.g., a memory and transmitter) configured to wireless transmit a CIK for detection at an external device.

The removable data cartridge 130 of FIG. 6 includes one or more connectors 270. The connector(s) 270 can be interfaced with an external device (e.g., a terminal or host system) by engaging the connector(s) with a suitable slot, receptacle, or connection located on the external device to provide a mechanical and electrical connection with the external device.

The removable data cartridge 130 of FIG. 6 includes a key memory interface 212. The key memory interface 212 can communicate one or more cryptographic keys 215 stored in the key memory 210 via the connector(s) 270 according to a first protocol. The first protocol can be a serial protocol suitable for the transfer of cryptographic keys, such as a serial protocol used by key fill devices. As an example, the first protocol can be a DS-101 or DS-102 protocol used for the transfer of key material. Other suitable protocols can be used as the first protocol without deviating from the scope of the present disclosure, such as a USB protocol, I2C protocol, SPI protocol, or other suitable protocol.

The removable data cartridge 130 of FIG. 6 further includes a data memory interface 222 that is separate from the key memory interface 212. The data memory interface 222 can communicate data subject to cryptographic processing 225 stored in the data memory 220 via connector(s) 270 using a second protocol. In some embodiments, the second protocol can be different from the first protocol. The second protocol can be, for instance, a serial protocol suitable for the transfer of data subject to cryptographic processing 225, such as a USB protocol, I2C protocol, SPI protocol, or other suitable protocol. The removable data cartridge 130 of FIG. 6 includes a CIK interface 252. The CIK interface 252 can communicate one or more CIKs 255 associated with the CIK device 250 using connector(s) 270. The one or more CIKs 255 can be used by the host system for user authentication.

Figure 7:
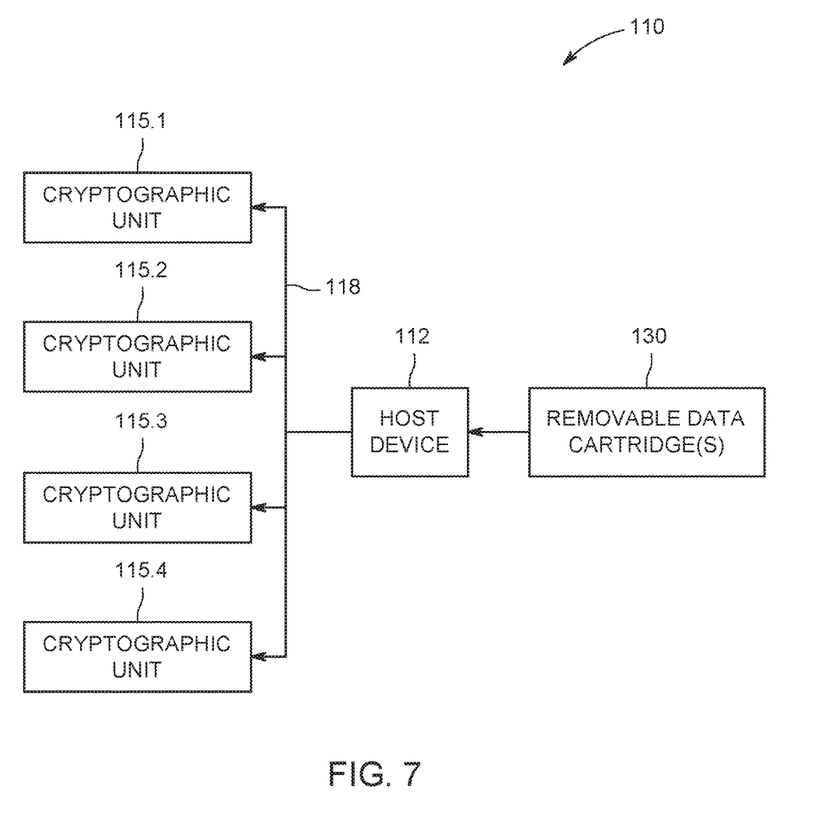
FIG. 7 depicts an example avionic data transfer system according to example embodiments of the present disclosure.

One example host system according to example embodiments of the present disclosure can be an avionic data transfer system having a plurality of cryptographic units. According to example aspects of the present disclosure, a host device (e.g., a cryptographic unit or other device) of the avionic data transfer system can act as a key server distributing one or more cryptographic keys loaded to the host device using a removable data cartridge to the one or more cryptographic units of the avionic data transfer system FIG. 7 depicts an example host system 110 according to example embodiments of the present disclosure. The host system 110 can be an avionic data transfer system associated with an aircraft. The host system 110 can include a plurality of cryptographic units 115. In FIG. 7, the host system 110 includes four cryptographic units 115.1, 115.2, 115.3, and 115.4. Those of ordinary skill in the art, using the disclosures provided herein, will understand that more or fewer cryptographic units 115 can be included in the host system 110 without deviating from the scope of the present disclosure.

The host system 110 includes a host device 112. The host device 112 can be a cryptographic unit configured for cryptographically processing of data. In addition and/or in the alternative, the host device 112 can be a dedicated device for interfacing with a key fill device or other external device for receiving one or more cryptographic keys. The host device 112 can include a slot, socket, receptacle, or connection to interface with an external device for loading one or more cryptographic keys to the host device 112.

In one embodiment, the host device 112 can be interfaced with a removable data cartridge 130. The removable data cartridge 130 can be any removable data cartridge according to example embodiments of the present disclosure. In one embodiment, the removable data cartridge 130 includes both a key memory storing one or more cryptographic keys and a data memory storing data subject to cryptographic processing. In this way, the removable data cartridge 130 can act as both a key fill device and a data transfer device. In some embodiments, the removable data cartridge 130 can include an embedded CIK device.

The host device 112 can be in communication with the cryptographic units 115.1, 115.2, 115.3, and 115.4 over a data bus 118. For instance, the host device 112 can be in communication with the cryptographic units 115.1, 115.2, 115.3, and 115.4 via an aircraft data bus, such as an MIL-STD-1554, ARINC-429, or other suitable data bus. In other embodiments, the host device 112 can be in communication with the cryptographic units 115.1, 115.2, 115.3, and 115.4 over an Ethernet connection or other data bus.

The host device 112 can act as a key server for the avionic data transfer system. More particularly, the host device 112 can receive one or more cryptographic keys from the removable data cartridge 130 according to example aspects of the present disclosure. The one or more cryptographic keys can include encrypted keys ("black keys") or decrypted keys ("red keys"). The host device 112 can also receive data subject to cryptographic processing (e.g., secure aviation data) from the removable data cartridge 130. The host device 112 can use the red keys and/or can decrypt the black keys for cryptographic processing of the data received from the removable data cartridge 130. In addition, the host device 130 can distribute one or more of the red keys and/or black keys to various of the cryptographic units 115.1, 115.2, 115.3, and 115.4 for cryptographic processing of data at the cryptographic units 115.1, 115.2, 115.3, and 115.4.

In one embodiment, the host device 112 can include a user interface (e.g., a graphical user interface presented on a display associated with the host device) that allows a user to interact with the host device 112 to distribute the one or more cryptographic keys among the various cryptographic units 115.1, 115.2, 115.3, and 115.4. For example, a user can interact with the user interface to specify that a particularly cryptographic key is to be distributed to cryptographic unit 115.2. The host device 112 can then distribute the cryptographic key to the cryptographic unit 115.2 for cryptographic processing.

In one embodiment, the host device 112 can automatically distribute the one or more cryptographic keys to the cryptographic units 115.1, 115.2, 115.3, and 115.4 based on header data associated with the one or more cryptographic keys received from the removable data cartridge 130. The header data for a cryptographic key can specify a particular destination cryptographic unit for the cryptographic key. For instance, the host device 112 can receive a cryptographic key having header data specifying that the cryptographic key is for use with cryptographic unit 115.1. The host device 112 can automatically distribute the cryptographic key to cryptographic unit 115.1 for cryptographic processing of data. The header data can be associated with the cryptographic key, for instance, at a terminal used for aviation planning.

According to example embodiments of the present disclosure, a cryptographic key configuration (CKC) can be generated at a terminal for configuration of various aspects of a cryptographic system. The CKC can be stored on a removable data cartridge at the terminal and transported to a host system, such as an avionic data transfer system associated with an aircraft. The CKC can be loaded into the avionic data transfer system and used to configure various aspects of the avionic data transfer system, such as mapping of authorized users and CIKs, mapping of cryptographic keys to various cryptographic units, etc.

Figure 8:
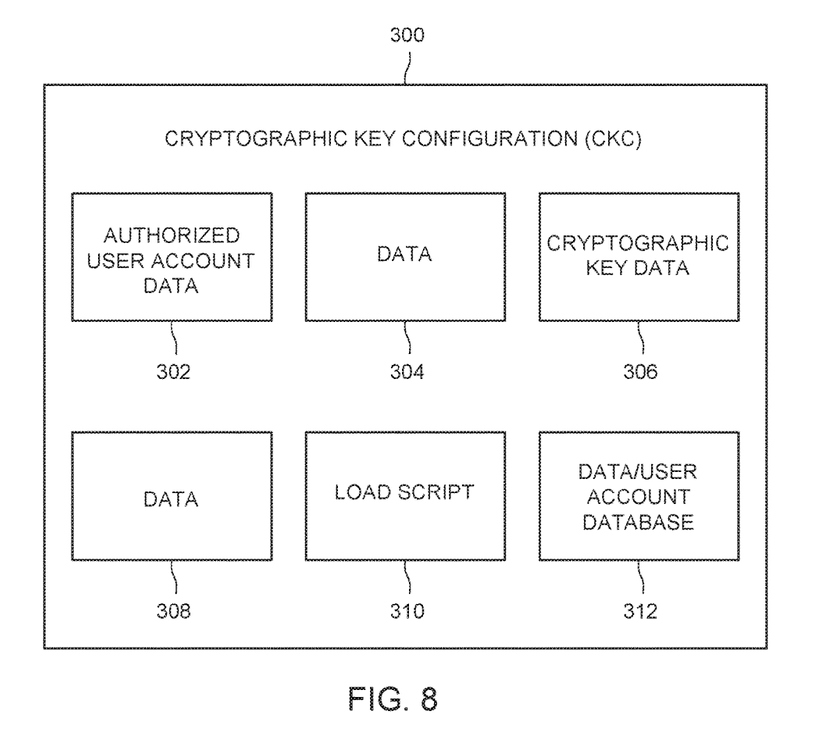
FIG. 8 depicts a representation of an example cryptographic key configuration (CKC) according to example embodiments of the present disclosure.

FIG. 8 depicts a representation of an example cryptographic key configuration (CKC) 300 according to example embodiments of the present disclosure. The CKC can include one or more of the authorized user account data 302, data 304 mapping authorized user accounts to CIKs, cryptographic key data 306, data 308 mapping cryptographic keys to one or more channels, slots, and/or cryptographic units, and/or a load script 310 for loading cryptographic keys and other information to an avionic data transfer system. In some embodiments, the CKC 300 can be a platform CKC (PCKC) that further includes data 312 indicative of cryptographic unit identifiers as well as a mapping of information to cryptographic units of an avionic data transfer system.

The authorized user account data 302 can include data identifying authorized users of the avionic data transfer system, such as individuals authorized to load and process secure aviation data into the avionic data transfer system. The data 304 can include one or more CIKs and data mapping CIKs to authorized users. The data 304 can be used by the avionic data transfer system in requiring the presence of a CIK from a CIK device (e.g., a removable data cartridge with an embedded CIK device) to authenticate an authorized user of the avionic data transfer system.

The one or more cryptographic keys 306 can be used by the host system for cryptographic processing of data (e.g., encrypting and/or decrypting data using various encryption algorithms). For instance, in one example embodiment, the one or more cryptographic keys 306 can be used to cryptographically process secure aviation data. The cryptographic keys 306 and data subject to cryptographic processing can be stored on the same removable storage device, such as a removable data cartridge having a dedicated key memory and a dedicated data memory according to example embodiments of the present disclosure.

The data 308 can be used to map cryptographic keys to various channels, slots, or cryptographic units in the host system. For instance, the data 308 can include header data associated with each of the one or more cryptographic keys. The header data for each cryptographic key can be indicative of the channel, slot, and/or cryptographic unit the cryptographic key is to be used for the cryptographic processing of data.

The load script 310 can be used to load the information from the CKC to the avionic data transfer system. In one embodiment, the load script can implement a key loader for loading keys to a data transfer system from a removable data cartridge according to example aspects of the present disclosure. For instance, the load script can cause one or more cryptographic keys to be loaded to a host device of the avionic data transfer system when the removable data cartridge is interfaced with the host device.

In some embodiments, the CKC can be a PCKC and can include additional data 312 indicative of cryptographic unit identifiers as well as a mapping of information to cryptographic units of an avionic data transfer system. The PCKC can be used to configure an avionic data transfer system having a plurality of cryptographic units. Cryptographic keys can be distributed to the plurality of cryptographic units, using for instance, a host device acting as a key server and in communication with the plurality of cryptographic units over, for instance, a data bus.

Figure 9:
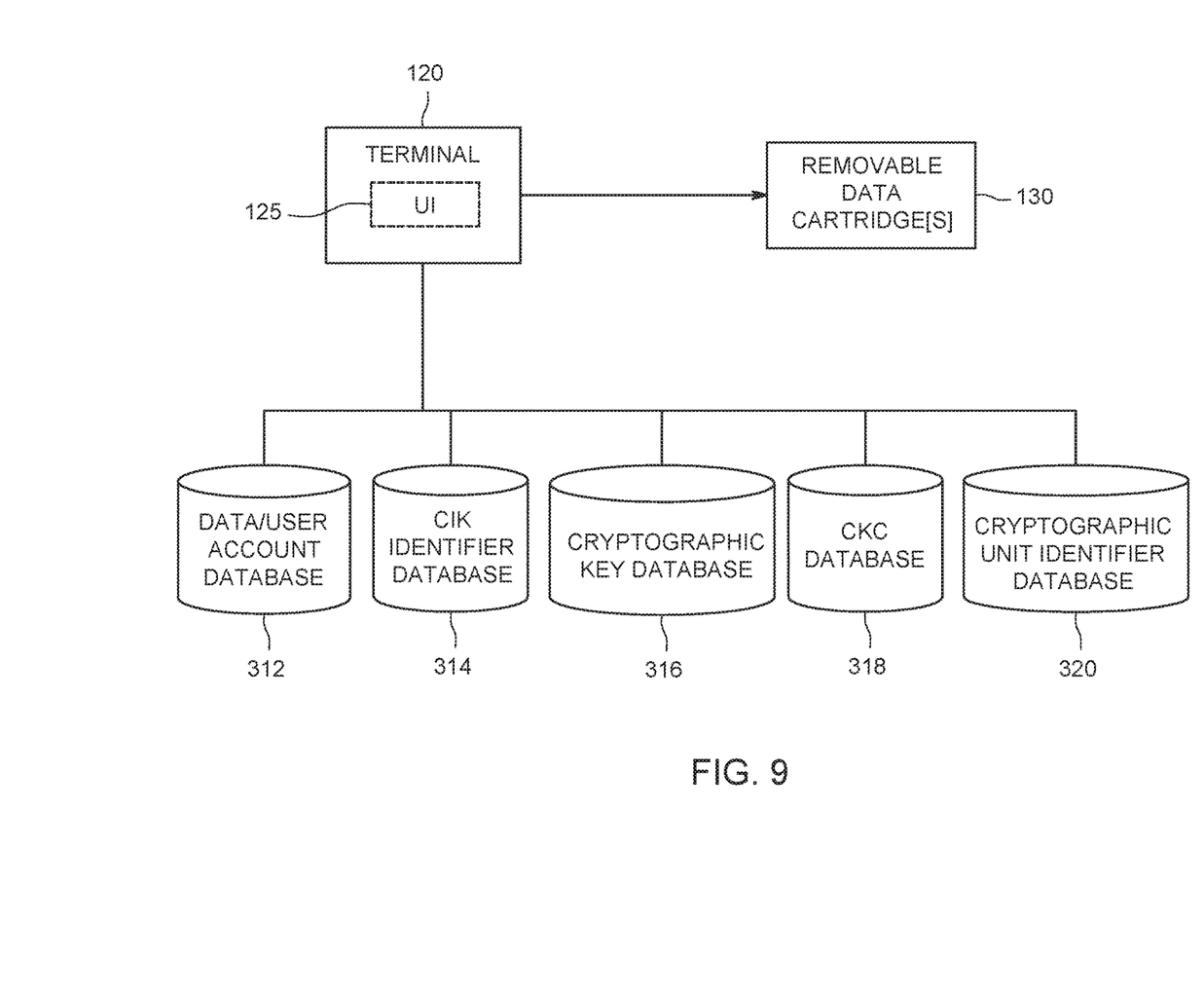
FIG. 9 depicts an example terminal for generating a CKC according to example embodiments of the present disclosure.

According to example embodiments of the present disclosure, the CKC can be generated at a terminal remote from the avionic data transfer system. For instance, FIG. 9 depicts a terminal 120 that can be used to generate a CKC according to example embodiments of the present disclosure. The terminal 120 can be used to generate the CKC and transfer the CKC to a removable data cartridge 130. The removable data cartridge 130 can then be interfaced with the avionic data transfer system to configure the cryptographic elements of the avionic data transfer system.

As shown the terminal 120 can access various databases to generate the CKC according to example embodiments of the present disclosure. For instance, the terminal 120 can access one or more of a user account database 312, a CIK identifier database 314, a cryptographic key database 316, a CKC database 318, and cryptographic unit identifier database 320. The user account database 312 can store data associated with authorized users of one or more cryptographic systems. The CIK identifier database 314 can store data associated with CIKs used for user authentication. Cryptographic key database 316 can store cryptographic keys for cryptographic processing of data by one or more cryptographic systems. CKC database 318 can store CKCs generated by the terminal 120, and cryptographic unit identifier database 320 can store data associated with various cryptographic units in one or more cryptographic systems.

The terminal 120 can access data stored in one or more of the databases 312, 314, 316, 318, and 320 and use the data to generate a CKC. The terminal 120 can include one or more processors and one or more memory devices storing computer-readable instructions that when executed by the one or more processors cause the one or more processors to implement a user interface 125. The user interface 125 allows an administrator to interact with the terminal to perform one or more CKC actions to generate a CKC. The CKC actions can include one or more of the following actions: (1) Retrieve user account data from a repository of user account data. (2) Create/modify/delete user account data in a repository of user account data. (3) Authorize user accounts for cryptographic processing. (4) Retrieve CIK identifier from a repository of CIK identifiers. (5) Create/modify/delete CIK identifiers in a repository of CIK identifiers. (6) Create/modify/delete links between CIK identifiers and User Account Data. (7) Retrieve cryptographic keys from a repository of cryptographic keys. (8) Create/modify/delete links between cryptographic unit channel slots and cryptographic keys. (10) Create/modify/delete CKCs in a repository of CKCs. (11) Create/modify/delete CKC files on a medium for transport to a host system, such as a removable data cartridge.

In embodiments where PCKCs are created, the user interface can allow the administrator to additionally perform one or more of the following CKC actions: (1) Create/modify/delete links between cryptographic equipment identifiers and user account data and CIKs and keys, and platforms. (2) Create/modify/delete scripts to automate the loading of PCKCs into cryptographic equipment on a platform. (3) Create/modify/delete PCKCs in a repository of PCKCs. (4) Create/modify/delete PCKC files on a medium for transport to a platform, such as a removable data cartridge.

Once the CKC has been generated at the terminal, the CKC can be stored on the removable data cartridge 130. The removable data cartridge 130 can then be interfaced with an avionic data transfer system to configure the avionic data transfer system for cryptographic processing of data according to example embodiments of the present disclosure.

Figure 10:
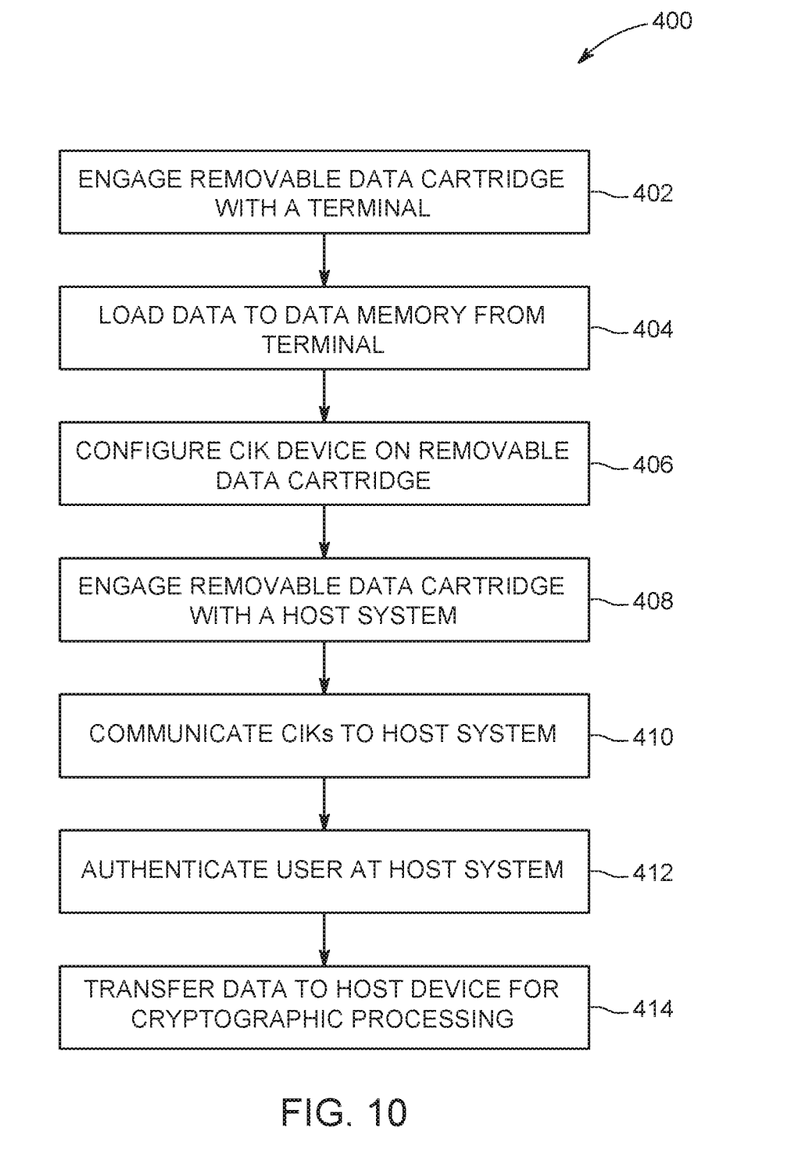
FIG. 10 depicts a flow diagram of an example method according to example embodiments of the present disclosure.

FIG. 10 depicts a flow diagram of an example method (400) according to example embodiments of the present disclosure. The method can be implemented using a cryptographic system, such as any of the cryptographic systems discussed herein. In addition, FIG. 10 depicts steps performed in a particular order for purposes of illustration and discussion. Those of ordinary skill in the art, using the disclosures provided herein, will understand that the steps of any of the methods described herein can be modified, expanded, omitted, adapted, or rearranged without deviating from the scope of the present disclosure.

At (402), the method includes engaging a removable data cartridge with a terminal. For instance, a removable data cartridge 130 having an embedded CIK device 250 and a data memory 220 can be engaged with a terminal 120. At (404), the method can include loading data subject to cryptographic processing to the data memory from the terminal. The data subject to cryptographic processing can be, for instance, aviation data. At (406), the method can include configuring the one or more CIKs for the CIK device. For instance, one or more CIKs can be associated with various authorized users at the terminal. The CIK device can be configured to communicate the CIKs for user authentication as will be discussed in detail below.

At (408), the removable data cartridge is engaged with a host system via at least one connector associated with the removable data cartridge. For example, the removable data cartridge can be inserted into a suitable receptacle, slot, or connection at the host system.

At (410), the method includes communicating one or more CIKs to the host system. For instance the one or more CIKs can be communicated to the host system from the CIK device via a CIK interface. In one embodiment, the one or more CIKs are communicated to the host system via at least one connector. For example, the one or more CIKs can be communicated to the host system via one or more first pins of the at least one connector. Alternative and/or in addition, the one or more CIKs can be communicated to the host device at least in part over a wireless interface.

At (412), the method can include authenticating a user of the host device based at least in part on the one or more CIKs. For instance, upon receipt or detection of a CIK by a host system and matching the CIK to an authorized user, the host system can enable cryptographic processing of data.

At (414), data can be transferred to the host system for cryptographic processing. For instance, For instance, the data subject to cryptographic processing can be transferred to the host system from the data memory of the removable data cartridge via a data memory interface. In one embodiment, the data subject to cryptographic processing can be transferred to the host system via one or more second pins of the at least one connector.

Once received at the host system, the data subject to cryptographic processing can then be cryptographically processed at the host system. For example, data subject to cryptographic processing can be encrypted and/or decrypted at the host system based at least in part on the one or more cryptographic keys. The cryptographic keys can be received via a key fill interface. In one embodiment, the cryptographic keys are received from a dedicated key memory on the removable data cartridge via a key memory interface.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A removable data storage device, comprising:
a housing comprising:
a data memory configured to store data subject to cryptographic processing;
at least one connector configured to be removably engaged with a host system;
a cryptographic ignition key device separate from the data memory, and comprising one or more cryptographic ignition keys to be transferred to the host system via a cryptographic ignition key interface for authentication of users;
a data memory interface in communication with the data memory and configured to communicate data subject to cryptographic processing to the host system via the at least one connector; and
the cryptographic ignition key interface configured to communicate the one or more cryptographic ignition keys to the host system to authenticate a user of the host system,
wherein the cryptographic ignition key and the data are transferred to the cryptographic ignition key device and the data memory of the removable data storage device, respectively, at a remote terminal, and
wherein once the user is authenticated at the host system, then the data from the removable data storage device is transferred to the host system.

2. The removable data storage device of claim 1, wherein the cryptographic ignition key interface is configured to communicate the one or more cryptographic ignition keys to the host system via the at least one connector.

3. The removable data storage device of claim 2, wherein the at least one connector comprises one or more first pins and one or more second pins, the cryptographic ignition key device configured to communicate the one or more cryptographic ignition keys via the one or more first pins, the removable data storage device configured to communicate data subject to cryptographic processing via the one or more second pins.

4. The removable data storage device of claim 1, wherein the cryptographic ignition key device comprises a memory storing the one or more cryptographic ignition keys.

5. The removable data storage device of claim 1, wherein the cryptographic ignition key interface comprises a wireless interface.

6. The removable data storage device of claim 1, wherein the removable data storage device further comprises a key loader that when implemented by one or more processors is configured to communicate one or more cryptographic keys for encrypting or decrypting data by the host system.

7. The removable data storage device of claim 1, wherein the host system comprises an avionic data transfer system associated with an aircraft.

8. A method of authenticating one or more users of a cryptographic system, the method comprising:
engaging a removable data storage device with a host system via at least one connector associated with the removable data storage device, the removable data storage device comprising a housing comprising a data memory configured to store data subject to cryptographic processing by the host system, and a cryptographic ignition key device separate from the data memory and comprising one or more cryptographic ignition keys, wherein, the cryptographic ignition key and the data are transferred to the cryptographic ignition key device and the data memory of the removable data storage device, respectively, at a remote terminal;
communicating, by the removable data storage device, the one or more cryptographic ignition keys to the host system initially via a cryptographic ignition key interface for authentication of users of the host system, and authenticating a user of the users; and
once the user is authenticated at the host system, then transferring, by the removable data storage device, the data subject to cryptographic processing to the host system from the data memory via a data memory interface.

9. The method of claim 8, wherein the method comprises:
loading data subject to cryptographic processing by a host system to the data memory associated with the removable data storage device;
configuring the one or more cryptographic ignition keys for the cryptographic ignition key device.

10. The method of claim 8, wherein the method comprises authenticating one or more users of the host system based at least in part on the one or more cryptographic ignition keys.

11. The method of claim 8, wherein the one or more cryptographic ignition keys are communicated to the host system via the at least one connector.

12. The method of claim 8, wherein the one or more cryptographic ignition keys are communicated to the host system via one or more first pins of the at least one connector and the data subject to cryptographic processing is transferred to the host system via one or more second pins of the at least one connector.

13. The method of claim 8, wherein the one or more cryptographic ignition keys are communicated to the host system at least in part over a wireless interface.

14. A cryptographic system for use with an aircraft, comprising:
an avionic data transfer system having one or more cryptographic units;
a removable data storage device, the removable data storage device comprising:
a housing,
at least one connector configured to be removably engaged with the avionic data transfer system,
a cryptographic ignition key device comprising one or more cryptographic ignition keys, and
a data memory separate from the cryptographic ignition key device and configured to store data subject to cryptographic processing wherein, the cryptographic ignition key and the data are transferred to the cryptographic ignition key device and the data memory of the removable data storage device, respectively, at a remote terminal;

wherein when the removable data storage device is engaged with the avionic data transfer system, the removable data storage device is configured to initially transfer the one or more cryptographic ignition keys to the aviation data transfer system via a cryptographic ignition key interface for use by the one or more cryptographic units in authenticating users, and authentication of a user of the users is initiated, and once the user is authenticated at the aviation data transfer system, the removable data storage device is further configured to transfer the data subject to cryptographic processing to the avionic data transfer system for cryptographic processing by the one or more cryptographic units.

15. The cryptographic system of claim 14, wherein the cryptographic ignition key device comprises a memory storing the one or more cryptographic ignition keys.

16. The cryptographic system of claim 14, wherein the cryptographic ignition key interface is configured to communicate the one or more cryptographic ignition keys to the avionic data transfer system via the at least one connector.

17. The cryptographic system of claim 16, wherein the at least one connector comprises one or more first pins and one or more second pins, the cryptographic ignition key device configured to communicate the one or more cryptographic ignition keys via the one or more first pins, the removable data storage device configured to communicate data subject to cryptographic processing via the one or more second pins.

18. The cryptographic system of claim 14, wherein the cryptographic ignition key interface is configured to communicate the one or more cryptographic ignition keys over a wireless interface.

19. The cryptographic system of claim 14, wherein the removable data storage device further comprises a key loader that when implemented by the one or more processors is configured to communicate one or more cryptographic keys for encrypting or decrypting data by the host system.

20. The cryptographic system of claim 14, wherein the data subject to cryptographic processing comprises aviation data.

* * * * *